US007683790B2

(12) United States Patent
Luquire (10) Patent No.: US 7,683,790 B2
(45) Date of Patent: Mar. 23, 2010

(54) SNAP-HOOK ASSEMBLIES WITH ADDED COMPONENTS

(75) Inventor: L. Hanson Luquire, Montgomery, AL (US)

(73) Assignee: Abstrac Products, Inc., Montgomery, AL (US)

(*) Notice: Subject to any disclaimer, the term of this patent is extended or adjusted under 35 U.S.C. 154(b) by 0 days.

(21) Appl. No.: 11/506,013

(22) Filed: Aug. 17, 2006

(65) Prior Publication Data
US 2007/0013530 A1    Jan. 18, 2007

Related U.S. Application Data

(63) Continuation of application No. 10/294,506, filed on Nov. 14, 2002, now Pat. No. 7,126,484, which is a continuation-in-part of application No. 10/253,226, filed on Sep. 24, 2002, now abandoned, and a continuation-in-part of application No. 29/160,032, filed on May 3, 2002, now Pat. No. Des. 471,305, and a continuation-in-part of application No. 29/160,034, filed on May 3, 2002, now Pat. No. Des. 475,591, and a continuation-in-part of application No. 29/160,035, filed on May 3, 2002, now Pat. No. Des. 474,095.

(51) Int. Cl.
    *G08B 13/00* (2006.01)
(52) U.S. Cl. .............. 340/574; 340/625; 292/1; 292/104; 292/205
(58) Field of Classification Search .............. 340/574, 340/542, 625, 676; 292/1, 104, 148, 205, 292/327; 7/118, 158, 104, 138, 151, 156, 7/161, 167, 168
    See application file for complete search history.

(56) References Cited

U.S. PATENT DOCUMENTS

| 731,329 | A | | 6/1903 | Till |
|---|---|---|---|---|
| 1,974,856 | A | | 9/1934 | White et al. |
| 2,621,550 | A | | 12/1952 | Bach |
| 2,833,017 | A | | 5/1958 | Patton |
| 3,908,875 | A | * | 9/1975 | Wilson et al. ............. 224/254 |
| 3,930,249 | A | | 12/1975 | Steek et al. |
| 4,095,316 | A | | 6/1978 | Gabriel |
| 4,228,589 | A | * | 10/1980 | Chemay ................. 33/759 |
| 4,244,220 | A | * | 1/1981 | Henson et al. ............ 374/141 |
| D271,466 | S | | 11/1983 | Boissonnet |
| 4,523,258 | A | | 6/1985 | Morse et al. |
| D282,904 | S | | 3/1986 | Faidide |
| 4,667,188 | A | | 5/1987 | Schwartz |

(Continued)

OTHER PUBLICATIONS

Page 137 of Sportsman's Guide caralog depicting Uniden EcoTrek Radios (undated; available to Applicant in 2002).

(Continued)

*Primary Examiner*—Daniel Previl
(74) *Attorney, Agent, or Firm*—Dean W. Russell; Kristin M. Crall; Kilpatrick Stockton LLP (57) ABSTRACT

Snap hook assemblies in which additional components have been incorporated are detailed. The assemblies maintain the general shapes of carabiners rather than those of conventional versions of the incorporated components. Included among the incorporated components may be light sources, knife blades, compasses, can or bottle openers, and watches, for example, although other components may be incorporated instead.

4 Claims, 10 Drawing Sheets

U.S. PATENT DOCUMENTS

| | | | |
|---|---|---|---|
| 4,712,279 A | 12/1987 | Hiraishi | |
| 4,788,532 A | 11/1988 | Maldonado | |
| 4,811,467 A | 3/1989 | Lowe | |
| 4,811,578 A | 3/1989 | Masoncup et al. | |
| 4,835,823 A | 6/1989 | Contat | |
| 4,837,559 A | 6/1989 | Green, Sr. | |
| 4,860,561 A | 8/1989 | Hwang | |
| 4,943,047 A | 7/1990 | Noble | |
| D311,642 S | 10/1990 | MacDonald | |
| D311,643 S | 10/1990 | MacDonald | |
| 5,005,266 A | 4/1991 | Fister et al. | |
| 5,042,277 A | 8/1991 | Jenn-Rong | |
| 5,194,845 A | 3/1993 | Sirmon et al. | |
| 5,270,909 A | 12/1993 | Weiss et al. | |
| 5,329,675 A * | 7/1994 | McLean et al. | 24/599.6 |
| 5,357,657 A | 10/1994 | Petzl | |
| 5,377,822 A * | 1/1995 | Herzog | 206/6.1 |
| 5,379,024 A | 1/1995 | Hsu | |
| 5,540,367 A * | 7/1996 | Kauker | 224/269 |
| D375,252 S | 11/1996 | Fabregas | |
| 5,577,304 A | 11/1996 | Simond | |
| 5,617,075 A | 4/1997 | Worth et al. | |
| 5,685,179 A | 11/1997 | Yang | |
| 5,704,236 A | 1/1998 | Parsons | |
| 5,712,623 A | 1/1998 | Kumai et al. | |
| 5,727,405 A | 3/1998 | Cromwell | |
| 5,731,757 A | 3/1998 | Layson, Jr. | |
| 5,731,785 A | 3/1998 | Lemelson et al. | |
| D396,661 S | 8/1998 | Bates | |
| 5,878,834 A | 3/1999 | Brainerd et al. | |
| 5,881,021 A | 3/1999 | Pirie et al. | |
| 5,921,657 A | 7/1999 | Case | |
| 5,956,985 A | 9/1999 | Chang | |
| 6,082,155 A | 7/2000 | Su | |
| D433,303 S | 11/2000 | Park | |
| 6,164,814 A | 12/2000 | Crow | |
| D435,764 S | 1/2001 | Schuster | |
| D436,305 S | 1/2001 | Schuster | |
| D439,120 S | 3/2001 | Schuster | |
| D441,473 S | 5/2001 | Parsons et al. | |
| 6,223,372 B1 * | 5/2001 | Barber | 7/118 |
| 6,227,015 B1 | 5/2001 | Luquire | |
| 6,236,319 B1 | 5/2001 | Pitzer et al. | |
| D444,685 S | 7/2001 | Shenkel et al. | |
| D445,518 S | 7/2001 | Warden | |
| D445,928 S | 7/2001 | Sharrah et al. | |
| D447,721 S | 9/2001 | Teabo | |
| 6,285,289 B1 | 9/2001 | Thornblad | |
| D449,438 S | 10/2001 | Simond | |
| 6,360,443 B1 | 3/2002 | Remus | |
| 6,371,055 B1 | 4/2002 | Lawrence | |
| 6,381,997 B1 | 5/2002 | Chen | |
| 6,401,501 B1 | 6/2002 | Kajuch | |
| 6,412,152 B1 * | 7/2002 | Ayliffe et al. | 24/598.5 |
| D466,422 S | 12/2002 | Luquire | |
| D471,305 S | 3/2003 | Luquire | |
| 6,527,434 B1 * | 3/2003 | Fox et al. | 368/276 |
| D474,095 S | 5/2003 | Luquire | |
| D475,591 S | 6/2003 | Luquire | |
| 6,625,469 B1 * | 9/2003 | Hwang et al. | 455/550.1 |
| 6,705,380 B2 | 3/2004 | Scolletta | |
| 7,126,484 B1 | 10/2006 | Luquire | |

OTHER PUBLICATIONS

Brochure page of K-Mart Corporation depicting Carabiner Hit Clips (undated; available to Applicant in 2002).

Packaging material for a "Light up Carabiner Clip" of Play Visions (copyright 2002).

* cited by examiner

SNAP-HOOK ASSEMBLIES WITH ADDED COMPONENTS

CROSS-REFERENCES TO RELATED APPLICATIONS

This application is a continuation of U.S. patent application Ser. No. 10/294,506 filed Nov. 14, 2002, now U.S. Pat. No. 7,126,484 now allowed, which is a continuation in part of each of (1) U.S. patent application Ser. No. 10/253,226, filed Sep. 24, 2002, entitled "Personal Alarm Device," abandoned; (2) U.S. patent application Ser. No. 29/160,032, filed May 3, 2002, entitled "Combination Snap Hook and Flashlight," now U.S. Design Pat. No. D471,305; (3) U.S. patent application Ser. No. 29/160,034, filed May 3, 2002, entitled "Snap Hook Bottle Opener," now U.S. Design Pat. No. D475,591; and (4) U.S. patent application Ser. No. 29/160,035, filed May 3, 2002, entitled "Combination Snap Hook and Knife," now U.S. Design Pat. No. D474,095. The contents of all of the applications identified above are incorporated herein in their entireties by this reference.

FIELD OF THE INVENTION

This invention relates to snap hooks and similar assemblies and to such assemblies incorporating additional components or functionality. Non-limiting examples of the assemblies include snap hooks to incorporating lights, knives, bottle or can openers, tools, watches, compasses, thermometers, writing implements, or combinations of these items.

BACKGROUND OF THE INVENTION

U.S. Pat. No. 5,270,909 to Weiss, et al., entitled "Openable Handle Attachment" and incorporated herein in its entirety by this reference, discloses various flashlights and mugs to which openable handles have been attached. The bulky flashlights of FIGS. 14 and 15 of the Weiss patent are identified as being "of the usual household" or "conventional" varieties, with elongated cylindrical bodies in which batteries are housed. Arms of the handle of each variety of flashlight are attached angularly to the elongated cylindrical bodies, forming discontinuities in the shapes of the flashlights. According to the Weiss patent, the flashlights may be actuated by sliding either a thumb switch or a base plate mounted on the cylindrical bodies or by rotating a switch or "by pressure asserted during lifting of the flashlight by the attached openable handle." See Weiss, col. 10, ll. 1-5.

Commonly-owned U.S. Pat. No. 6,227,015 to Luquire, the inventor of the subject matter described and claimed herein, details padlocks with pivoting arms. The padlocks additionally include shackles formed of curved sections, with the arms positioned between ends of the shackles. The Luquire patent is also incorporated herein in its entirety by this reference.

SUMMARY OF THE INVENTION

The present invention provides snap-hook assemblies in which additional components have been incorporated. Unlike the objects of the Weiss patent, for example, the assemblies of the invention lack a separate mug or bulky cylindrical flashlight body. Instead, they maintain the general shape of the padlocks of the Luquire patent, thus resembling carabiners rather than conventional versions of the incorporated components.

In some embodiments of the invention, the assemblies include handles comprising two curved sections separated by a generally straight section. A pivoting arm may separate opposite ends of the curved sections. Alternatively, the pivoting arm may be incorporated into the generally straight section of the handles.

In use, the arm is adapted to open into a space bounded by the handle and is biased closed (by a spring or other biasing mechanism). Opening the arm permits an object to be received into the bounded space, and closing it traps the received object therein. The innovative assemblies thus operate as snap hooks and typically (although not necessarily) will be used with straps, belt loops, handles, or other objects to which they may be connected.

Certain embodiments of the assemblies also include an illumination mechanism and thus may be considered as "light sources" or "flashlights." Unlike the actuators of the Weiss patent, actuation devices in these embodiments may comprise either a rotatable lamp housing or a depressable (push-button) switch. Although not preferred, the sliding plates or thumb switches of the Weiss patent sometimes may be used instead. Typically, the head is removable to allow replacement of both the light and power sources for the assembly.

Other embodiments of the assemblies incorporate one or more knife blades or other tools (including, without limitation, scissors, files, saw blades, pliers, and screw drivers), in this respect including items such as those often included in Swiss Army knifes. In these embodiments, a section of the handle beneficially contains a storage slot for the (or each) blade or other tool when not in use. Any blade may be adapted to pivot, or retract and extend, into or out of the slot as desired. Preferably both the facing of the slot and extension of the blade are away from the bounded area, so that the knife blade does not interfere with use of the pivoting arm.

Assemblies of the present invention alternatively or additionally may include bottle openers, can openers, compasses, watches, thermometers, writing implements (e.g. pens, pencils), tools, or other useful items. Such items usually are incorporated into sections of the handles remote from the pivoting arms. They may, however, be incorporated elsewhere in the assemblies if appropriate or desired.

It thus is an optional, non-exclusive object of the present invention to provide snap hook (or similar) assemblies in which one or more additional components has been incorporated.

It is another optional, non-exclusive object of the present invention to provide assemblies generally resembling carabiners.

It is also an optional, non-exclusive object of the present invention to provide handles comprising two curved sections separated by a section housing some or all of an additional component, with intersections of at least some of these sections being continuous (hence lacking any discontinuity).

It is a further optional, non-exclusive object of the present invention to provide pivoting arms adapted to open into spaces bounded by the handles, with such arms being biased closed.

Other objects, features, and advantages of the present invention will be apparent to those skilled in the relevant art with reference to the remaining text and drawings of this application.

DETAILED DESCRIPTION

FIGS. 1-5 depict snap-hook assembly 10 of the present invention. Included as part of assembly 10 are handle 14 and arm 18, the latter of which is designed to pivot about pin 22. Collectively, handle 14 and arm 18 bound an interior region IR in which an object (such as, but not limited to, a belt loop, strap, handle, etc.) may be received and retained.

Figure 1:
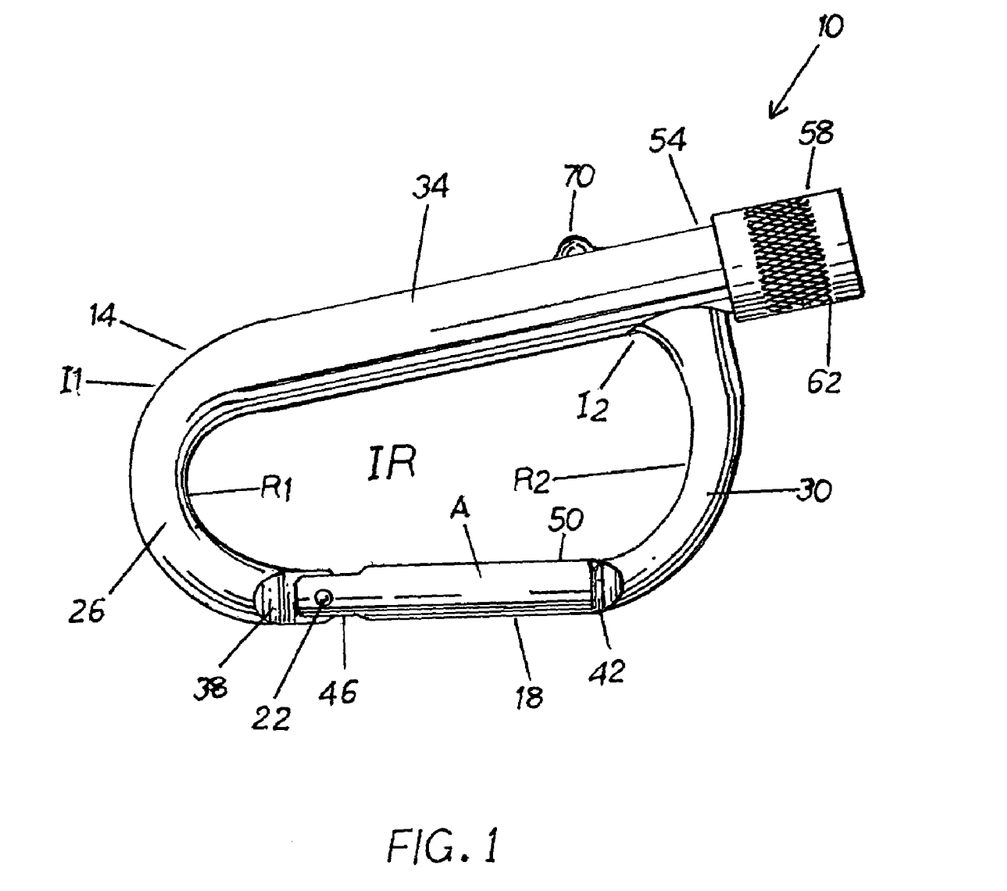
FIGS. 1-5 illustrate an exemplary assembly of the present invention containing a light source.
Figure 2:
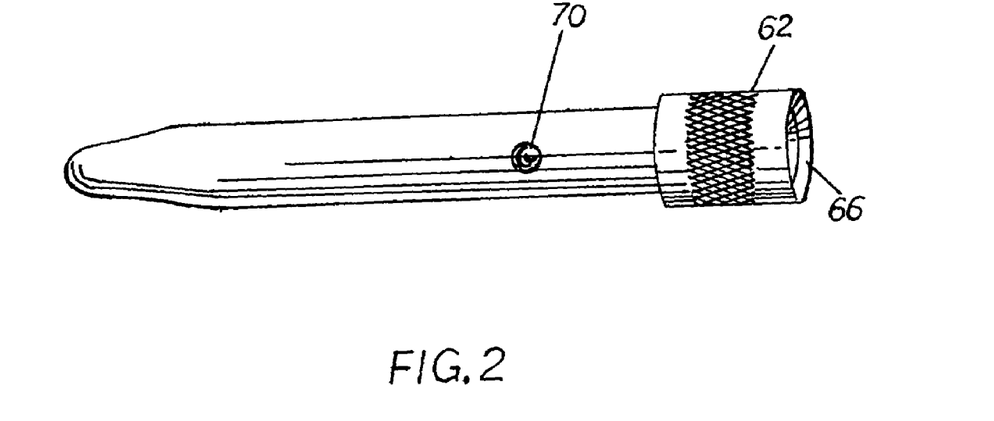

As shown in FIG. 1, handle 14 may comprise curved sections 26 and 30 separated by section 34. The radius of curvature $R_1$ of section 26 typically is less than the radius of curvature $R_2$ of section 30, so that handle 14 is not symmetric laterally. By contrast, section 34 usually is straight (or relatively so) in cross-section, so that the appearance of assembly 10 resembles a human ear or carabiner. Assembly 10 need not necessarily be oblong, however, but rather may assume other desired shapes.

In some embodiments of assembly 10, furthermore, handle 14 need not be laterally asymmetric. In preferred embodiments, however, sections 26 and 34 are continuous, with no discontinuity present at their intersection $I_1$. This differs from the structures of the flashlights depicted in FIGS. 14-15 of the Weiss patent, in which arms 84 and 94 intersect bodies 80 and 90 at acute or right angles, respectively. Stated differently, the structure of assembly 10 is intended to be that of a carabiner-style snap-hook object, while the devices of FIGS. 14-15 of the Weiss patent appear intended to be bulky, full-size flashlights with handles attached as ancillary items.

Arm 18 spans the distance between spaced ends 38 and 42 of curved sections 26 and 30, respectively. Pin 22 connects end 46 of arm 18 to end 38 of curved section 26. A spring or other biasing mechanism cooperates with pin 22 to bias arm 18 into the "closed" position shown in FIG. 1, thus bounding interior region IR. To permit access to region IR, a user of assembly 10 need merely rotate arm 18 about pin 22 in the direction of arrow A, separating end 50 of arm 18 from end 42 of curved section 30. When interior region IR is accessible in this manner, arm 18 is denominated "open."

Detailed at end 54 of section 34 opposite its intersection with curved section 26 is housing 58. Housing 58 preferably includes a rotatable collar 62 containing a light source (typically a lamp) and a protective component such as lens 66. Collar 62 likewise preferably is removable from section 34 to allow access to the light source and any power source contained either within housing 58 or any of sections 26, 30, or 34. In some embodiments of the invention, section 34 is hollow and sufficiently straight and long to receive a single AA-size battery. In these (and other) embodiments, appropriate electrical connections between the power source and light source also exist as part of assembly 10. Actuation of the light source may occur through rotation of collar 62, for example, or by depressing a momentary or other push-button switch 70 placed on the exterior of assembly 10. Those skilled in the art will recognize that other actuation mechanisms may be used instead as appropriate or desired.

By contrast with the continuity at the intersection of sections 26 and 34, the overall shape of preferred versions of assembly 10 is discontinuous at the intersection $I_2$ of section 34 and housing 58. In the versions detailed in FIG. 1, for example, section 34 and housing 58, although both cylindrical at their intersection, have differing diameters. Indeed, in the detailed version, the diameter of housing 58 is greater than that of section 34 at their intersection. This again differs from the structures of the Weiss patent, in which transition regions exist between the respective heads and bodies, consistent with configurations of conventional full-size flashlights.

Figure 3:
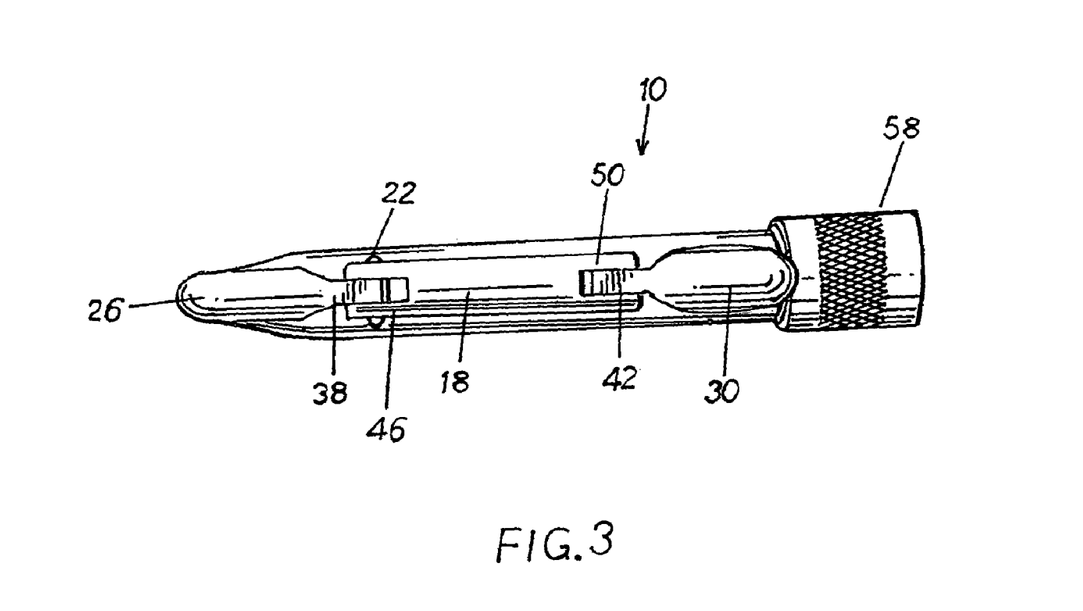
Figure 4:
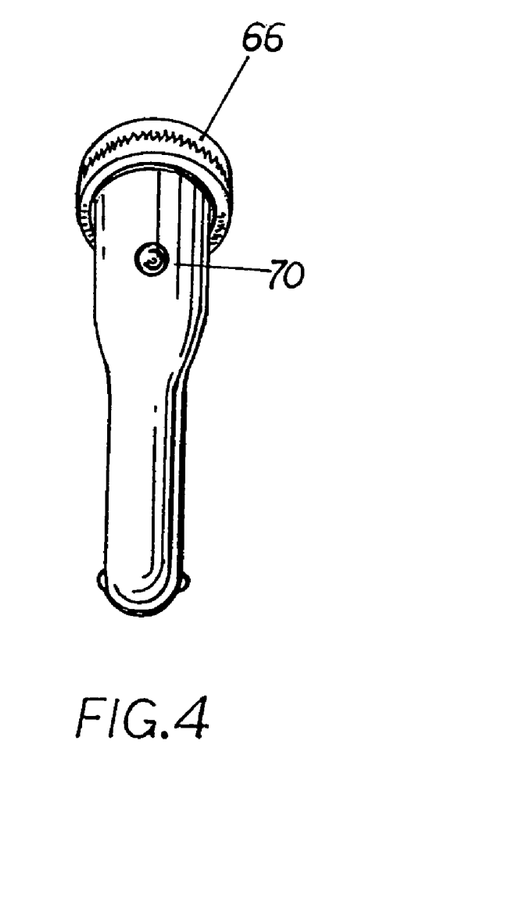
Figure 5:
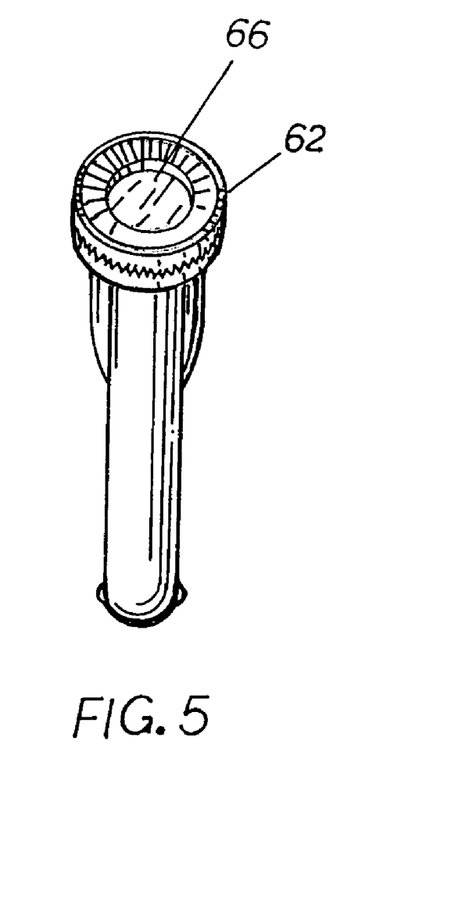

Finally, shown especially in FIG. 3 is the interaction between arm 18 and sections 26 and 30. Arm 18 preferably includes slots at each of ends 46 and 50. The slot at end 46 permanently receives both pin 22 and end 38 of section 26, while the slot at end 50 receives end 42 of section 30 only when assembly 10 is closed.

Figure 6:
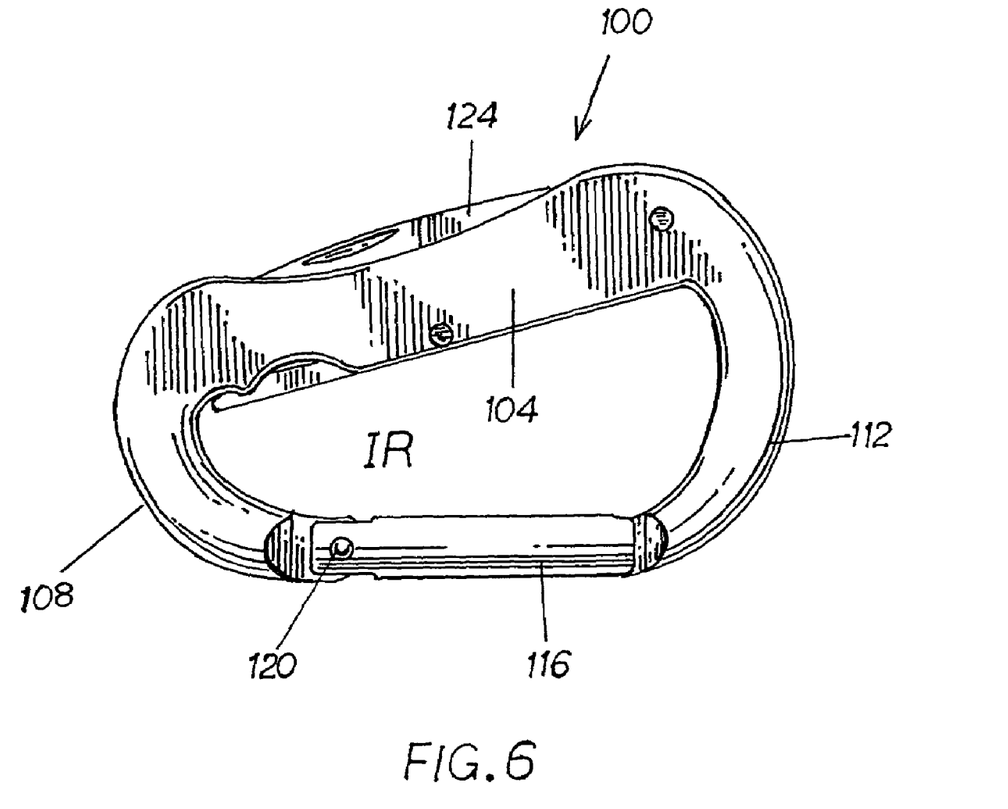
FIGS. 6-11 illustrate another exemplary assembly of the present invention containing a knife blade.
Figure 7:
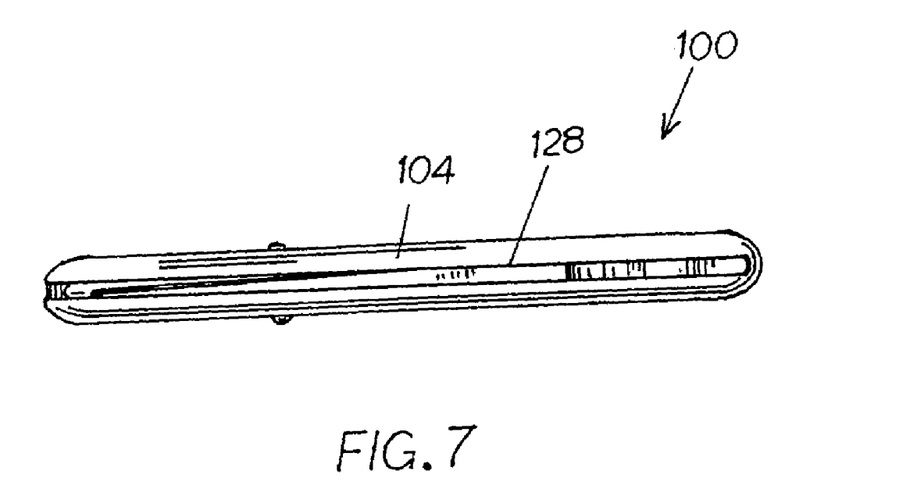
Figure 8:
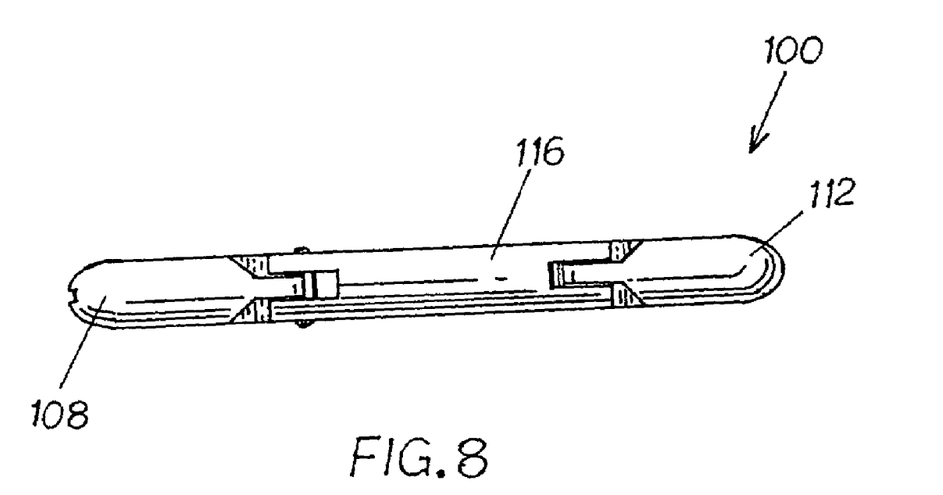
Figure 9:
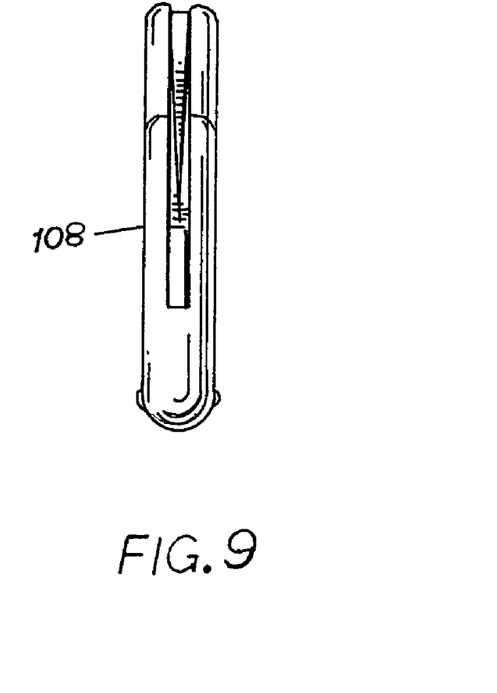
Figure 10:
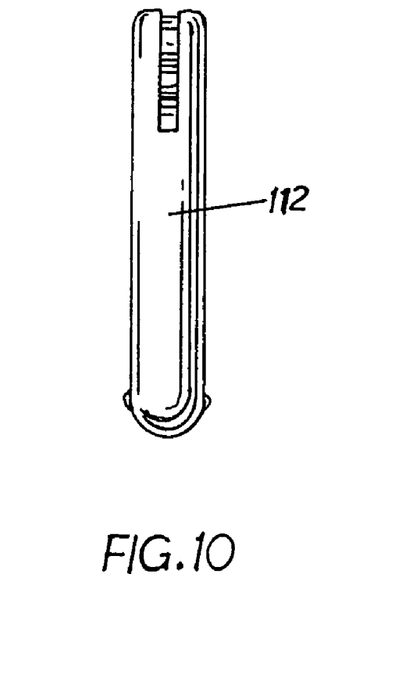

Illustrated in FIGS. 6-11 is an alternative snap-hook assembly 100. Like assembly 10, assembly 100 may comprise sections 104, 108, and 112, the former of which is generally straight in cross-section, while the latter two of which typically are curved. Assembly 100 similarly may include arm 116, spanning the distance between ends of sections 108 and 112, and pin 120 about which arm 116 may pivot in use. Again as with assembly 10, assembly 100 bounds an interior region IR' when closed, and the intersection of sections 104 and 108 may be a continuous curve. Indeed, the intersection of sections 104 and 112 also may be a continuous curve as shown in FIG. 6.

Figure 11:
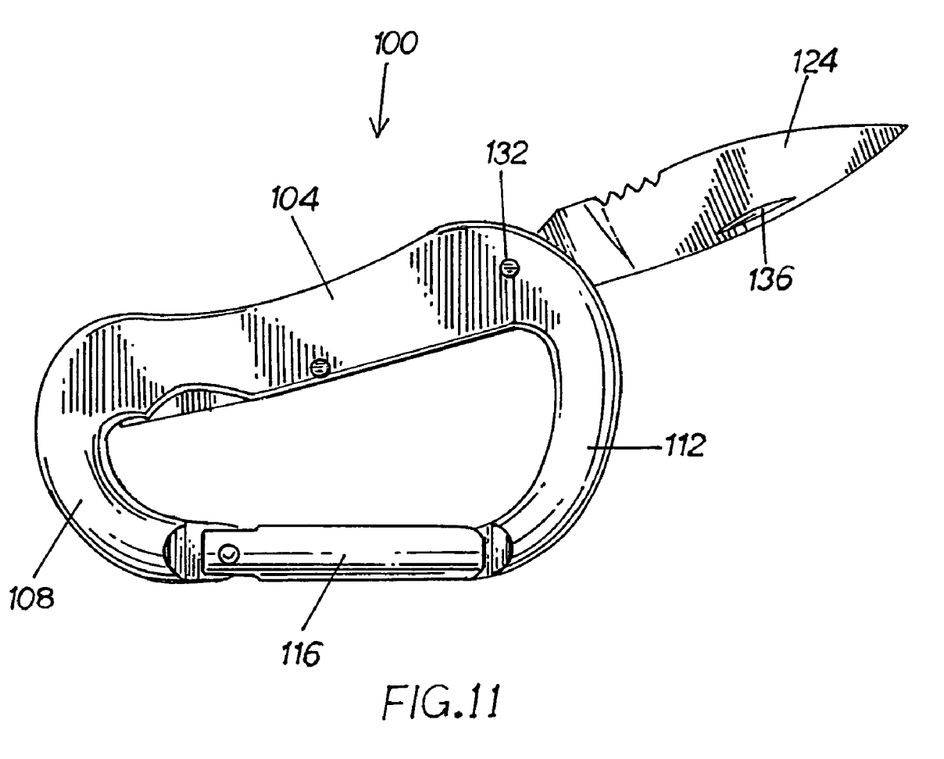

Section 104 is intended to house tool 124, which as depicted in FIGS. 6-11 comprises a knife blade. Those skilled in the art will, of course, recognize that section 104 may house other, or additional, tools instead and in some cases will include multiple tools. To accommodate tool 124, section 104 includes slot 128 in which tool 124 is received when not in use. To use the tool 124, the user need merely pivot it about pin 132 (as shown in FIG. 11), thereby exposing tool 124. Preferably (if a knife blade), tool 124 will include indentation 136 to receive the user's thumbnail to facilitate extraction of the tool 124 from slot 128.

Figure 12:
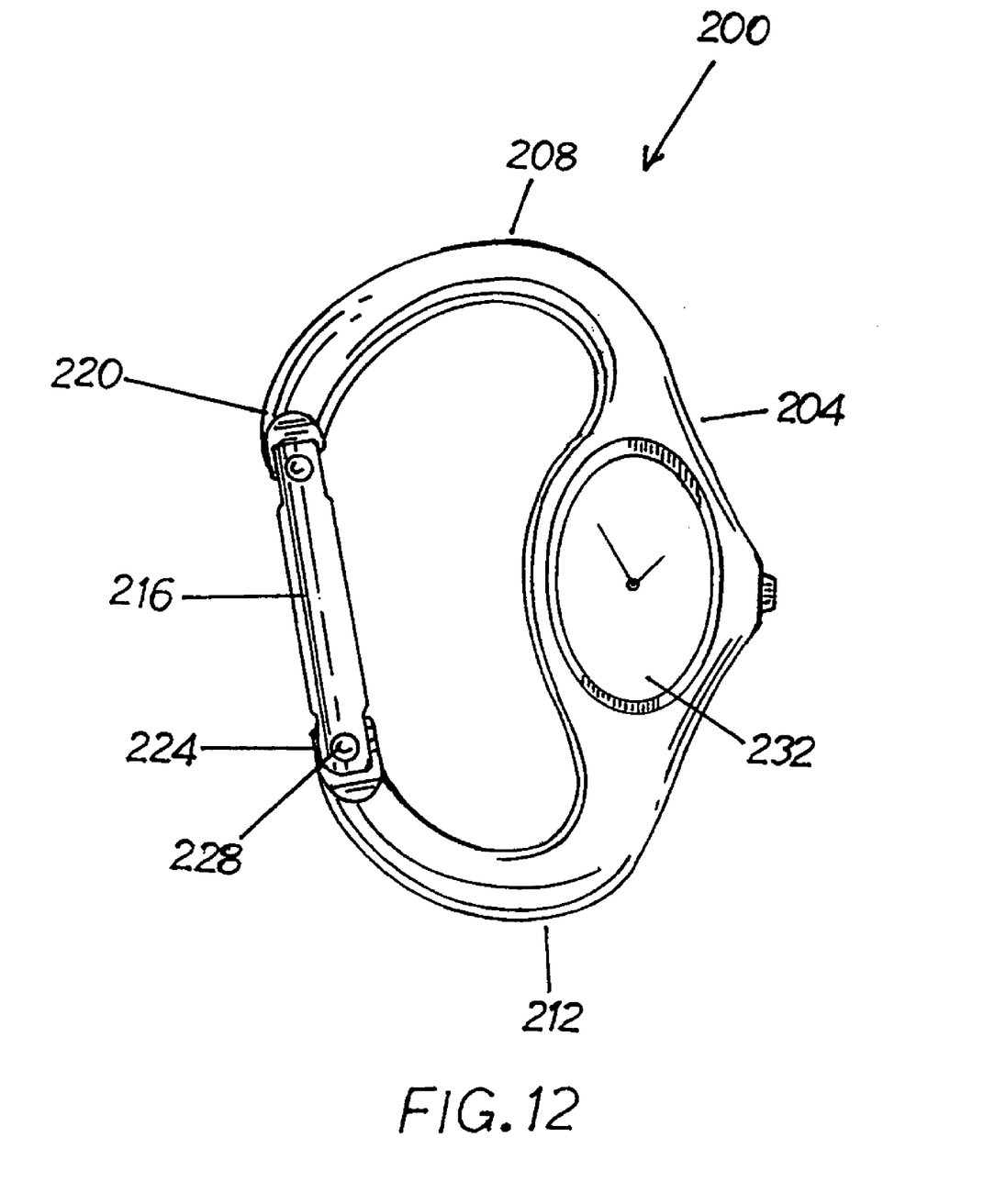
FIG. 12 illustrates an exemplary assembly of the present invention containing a watch.
Figure 13:
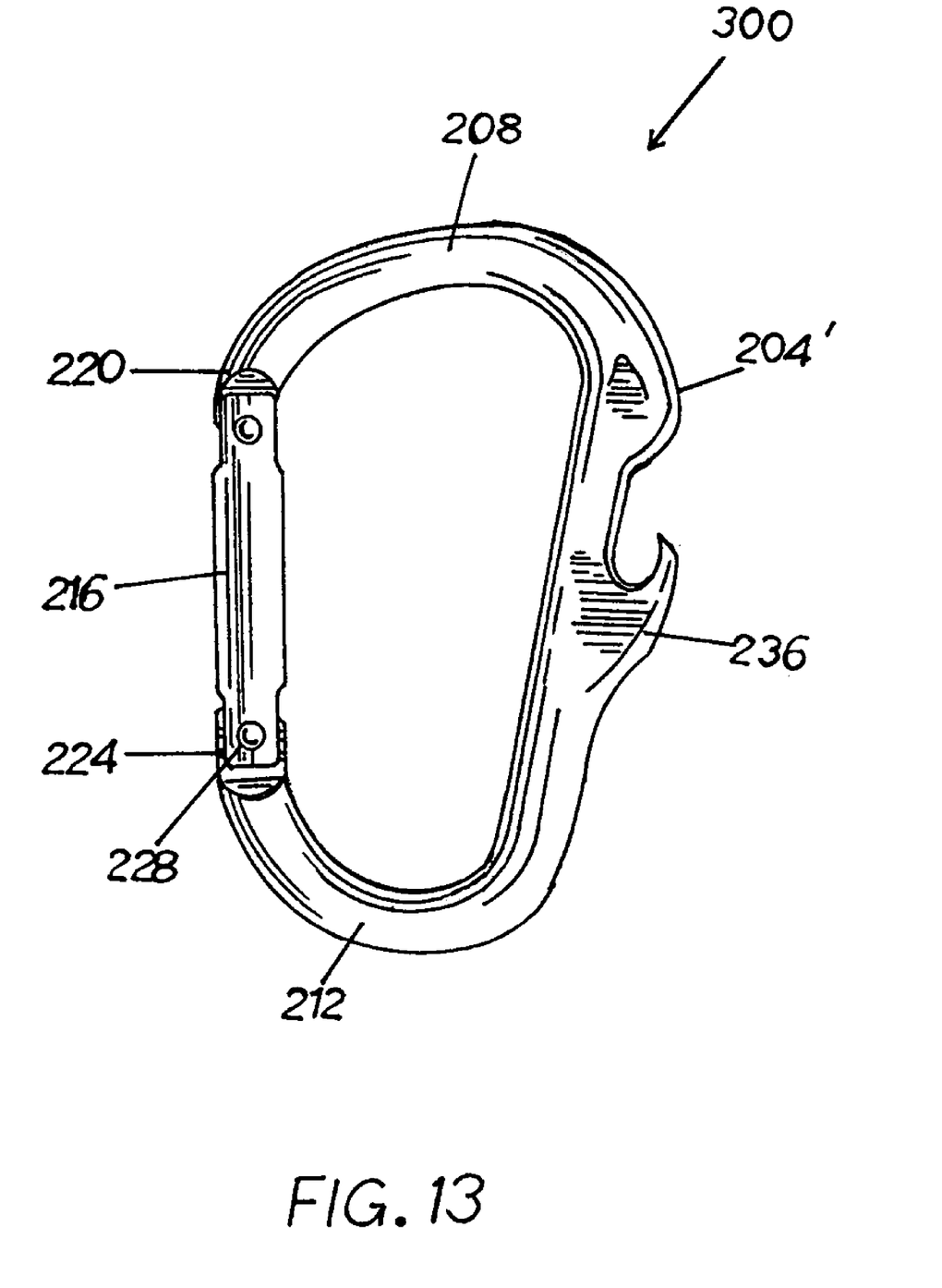
FIG. 13 illustrates an exemplary assembly of the present invention containing a bottle opener.
Figure 14:
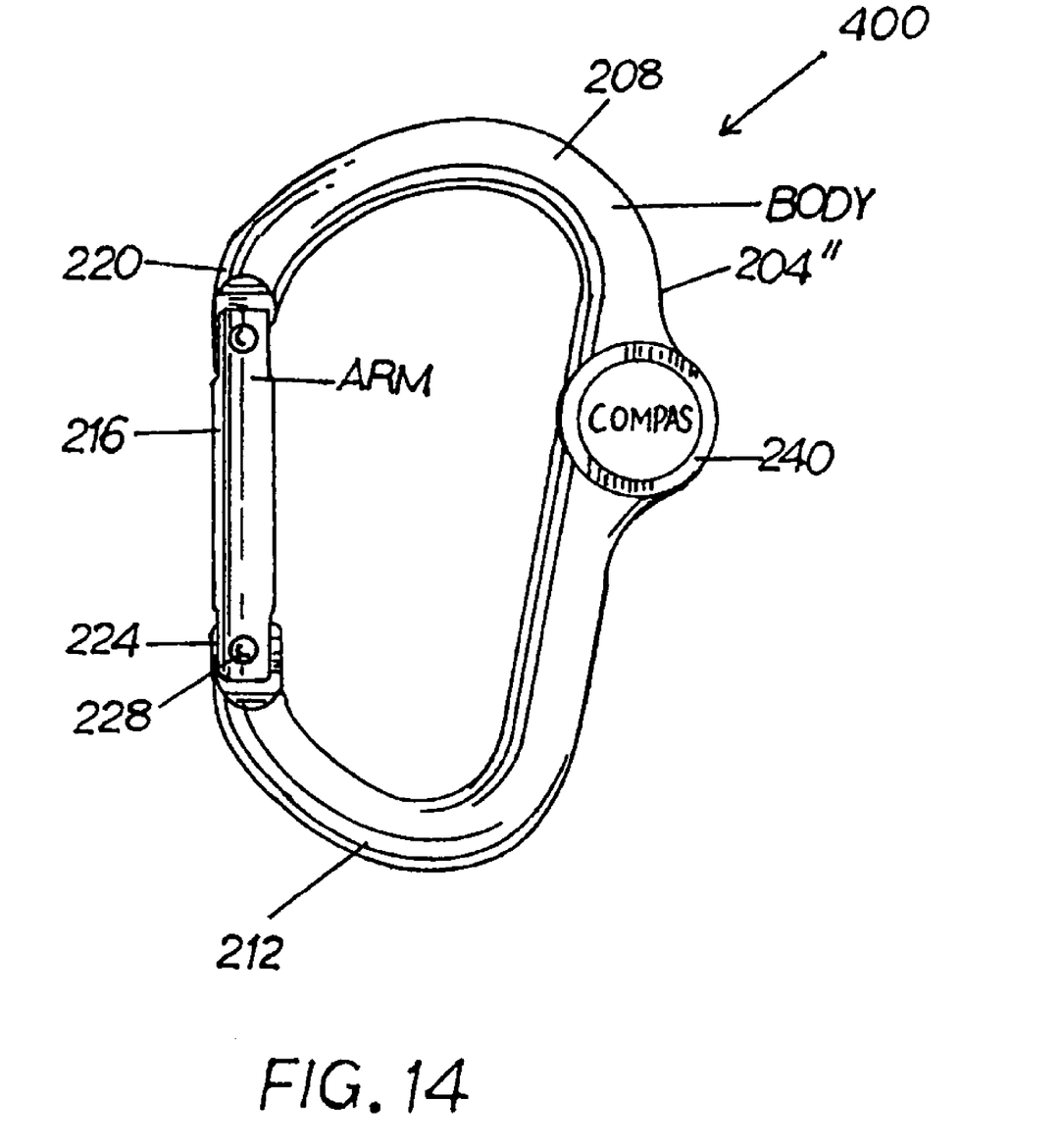
FIG. 14 illustrates an exemplary assembly of the present invention containing a (navigational) compass.

FIGS. 12-14 illustrate yet alternative assemblies 200, 300, and 400 configured consistent generally with principles espoused earlier in this application. Assembly 200, for example, includes sections 204, 208, and 212, with sections 208 and 212 being curved and laterally asymmetric. Arm 216 spans the distance between respective ends 220 and 224 of sections 208 and 212 and beneficially may pivot about pin 228 to open and close, thus permitting assembly 200 to function as a snap hook. By contrast with analogous sections of other assemblies, section 204 houses watch 232 and any ancillary equipment, while section 204' houses bottle opener 236. Section 204" of FIG. 14, finally, houses navigational compass 240 instead.

Any or all of assemblies 10, 100, 200, 300, and 400 may include components in addition to those expressly depicted in their corresponding drawings. For example, locking mechanisms, such as those described in the Luquire patent, may be incorporated in any of these assemblies. Appropriate modifications to the assemblies similarly could permit two or more additional components to be included in the same assembly. Assembly 10, for example, could include both a light source and tool 124, watch 232, bottle opener 236, or compass 240. Other assemblies could be adapted similarly. Thus, although the foregoing has been provided for purposes of illustrating, explaining, and describing exemplary embodiments and certain benefits of the present invention, modifications and adaptations to the illustrated and described embodiments will be apparent to those skilled in the relevant art and may be made without departing from the scope or spirit of the invention.

What is claimed is:

1. A snap-hook assembly comprising:
   a. a body section having spaced first and second ends;
   b. an arm abutting the first end and pivoting therefrom, the arm being configured to pivot between:
      i. a closed position in which the arm adjoins the second end to bound an interior region in which an object is received arid retained; and
      ii. an open position in which the arm is remote from the second end, allowing the object to be removed from the interior region; and
   c. a navigational compass integrally formed with the body section of the snap-hook assembly.

2. A snap-hook assembly according to claim 1 in which the navigational compass comprises a face providing navigational information and the arm pivots in a plane containing the face.

3. A snap-hook assembly according to claim 2 in which the arm is generally straight.

4. A snap-hook assembly according to claim 3 in which the arm is biased toward the closed position.

* * * * *